US008496266B2

(12) United States Patent
Gmitter et al.

(10) Patent No.: US 8,496,266 B2
(45) Date of Patent: Jul. 30, 2013

(54) GAS GENERATING SYSTEM

(75) Inventors: Emily Gmitter, Franklin, IN (US);
Richard W. Morgan, Washington, MI (US); David M. McCormick, St. Clair Shores, MI (US); Jeffrey Anderson, Clinton, MI (US)

(73) Assignee: TK Holdings, Inc., Armada, MI (US)

( * ) Notice: Subject to any disclaimer, the term of this patent is extended or adjusted under 35 U.S.C. 154(b) by 88 days.

(21) Appl. No.: 12/012,042

(22) Filed: Jan. 31, 2008

(65) Prior Publication Data
US 2008/0150266 A1 Jun. 26, 2008

Related U.S. Application Data

(63) Continuation-in-part of application No. 11/445,859, filed on Jun. 1, 2006.

(60) Provisional application No. 60/686,906, filed on Jun. 2, 2005, provisional application No. 60/898,948, filed on Jan. 31, 2007.

(51) Int. Cl.
*B60R 21/26* (2011.01)
*B60R 21/264* (2006.01)

(52) U.S. Cl.
USPC ........... 280/741; 280/736; 102/530; 422/166; 422/305

(58) Field of Classification Search
USPC ........... 280/736, 741; 102/530, 531; 422/164, 422/165, 166, 305
See application file for complete search history.

(56) References Cited

U.S. PATENT DOCUMENTS

| | | | | |
|---|---|---|---|---|
| 5,183,268 A * | 2/1993 | Wong et al. | | 277/328 |
| 5,318,323 A * | 6/1994 | Pietz | | 280/736 |
| 5,542,702 A | 8/1996 | Green et al. | | 280/737 |
| 5,553,889 A * | 9/1996 | Hamilton et al. | | 280/736 |
| 5,938,235 A * | 8/1999 | Butt | | 280/737 |
| 5,951,041 A * | 9/1999 | Iwai et al. | | 280/737 |
| 6,210,505 B1 * | 4/2001 | Khandhadia et al. | | 149/36 |
| 6,620,266 B1 * | 9/2003 | Williams et al. | | 149/3 |
| 7,137,646 B2 * | 11/2006 | Blackburn et al. | | 280/737 |
| 7,367,584 B2 * | 5/2008 | Blackburn | | 280/736 |
| 7,370,885 B2 * | 5/2008 | Stevens | | 280/741 |
| 7,377,545 B2 * | 5/2008 | Kodama et al. | | 280/736 |
| 7,431,335 B2 * | 10/2008 | Khandhadia et al. | | 280/737 |
| 7,806,954 B2 | 10/2010 | Quioc | | 55/385.3 |
| 2002/0070537 A1 * | 6/2002 | Webber et al. | | 280/730.2 |

(Continued)

FOREIGN PATENT DOCUMENTS
WO WO 96/40541 12/1996

OTHER PUBLICATIONS

Office Action U.S. Appl. No. 12/290,556, filed Oct. 31, 2008, Dated Nov. 23, 2010.

(Continued)

*Primary Examiner* — Joseph Rocca
*Assistant Examiner* — Barry Gooden, Jr.
(74) *Attorney, Agent, or Firm* — L.C. Begin & Associates, PLLC

(57) ABSTRACT

A gas generating system usable in an inflatable vehicle occupant protection system is provided. The system includes an outer housing having an outer diameter varying within a range of approximately 16 millimeters to approximately 20 millimeters. A vehicle occupant protection system and an airbag module including the gas generating system are also provided.

15 Claims, 3 Drawing Sheets

U.S. PATENT DOCUMENTS

| | | |
|---|---|---|
| 2002/0190510 A1* | 12/2002 | Yamazaki .................... 280/736 |
| 2003/0001369 A1* | 1/2003 | Iwai et al. .................... 280/741 |
| 2003/0230367 A1 | 12/2003 | Mendenhall et al. ........... 149/45 |
| 2004/0006979 A1* | 1/2004 | Parks .............................. 60/412 |
| 2004/0046373 A1* | 3/2004 | Wang et al. ................... 280/741 |
| 2004/0100079 A1* | 5/2004 | Yamazaki et al. ............. 280/741 |
| 2004/0201208 A1* | 10/2004 | Longhurst et al. ............ 280/741 |
| 2004/0256847 A1* | 12/2004 | Quioc et al. ................... 280/741 |
| 2005/0073138 A1 | 4/2005 | Digangi et al. ............... 280/737 |
| 2005/0110253 A1* | 5/2005 | Khandhadia et al. ......... 280/736 |
| 2005/0189750 A1 | 9/2005 | Gotoh et al. .................. 280/737 |
| 2005/0225064 A1* | 10/2005 | Suehiro et al. ................ 280/741 |
| 2006/0157961 A1* | 7/2006 | Burns ........................... 280/736 |
| 2006/0162607 A1* | 7/2006 | Kodama et al. ............... 102/530 |

OTHER PUBLICATIONS

Office Action U.S. Appl. No. 12/655,768, filed Jan. 7, 2010, Dated Oct. 1, 2010.

* cited by examiner

GAS GENERATING SYSTEM

CROSS REFERENCE TO RELATED APPLICATIONS

This application claims the benefit of U.S. Provisional Application Ser. No. 60/898,948 filed on Jan. 31, 2007, and is also a continuation-in-part of U.S. application Ser. No. 11/445,859 filed on Jun. 1, 2006, which claims the benefit of U.S. Provisional Application Ser. No. 60/686,906 filed on Jun. 2, 2005.

BACKGROUND OF THE INVENTION

The present invention relates generally to gas generating systems and, more particularly, to gas generating systems for use in applications such as inflatable occupant restraint systems in motor vehicles.

Installation of inflatable occupant protection systems as standard equipment in all new vehicles has intensified the search for smaller, lighter and less expensive protection systems. Accordingly, since the inflation gas generator, or inflator, used in such protection systems tends to be the heaviest and most expensive component, there is a need for a lighter and less expensive gas generating system.

Yet another concern involves reducing the size of the inflator, thereby reducing the packaging size and providing greater design flexibility in various applications or uses. Furthermore, reducing the size of the inflator reduces the raw material requirements, and may also advantageously reduce the manufacturing complexity, thereby reducing overall manufacturing costs.

SUMMARY OF THE INVENTION

The present invention provides a gas generating system comprising an outer housing having an outer diameter varying within a range of approximately 16 millimeters to approximately 20 millimeters.

In another aspect of the invention, a gas generating system is provided which includes an outer housing having an outer diameter of approximately 16 millimeters along substantially its entire length.

The present invention also provides a vehicle occupant protection system and an airbag module including the gas generating system.

DETAILED DESCRIPTION

This application is a continuation-in-part of co-pending U.S. application Ser. No. 11/445,859 filed on Jun. 1, 2006, hereby incorporated by reference.

Figure 1:
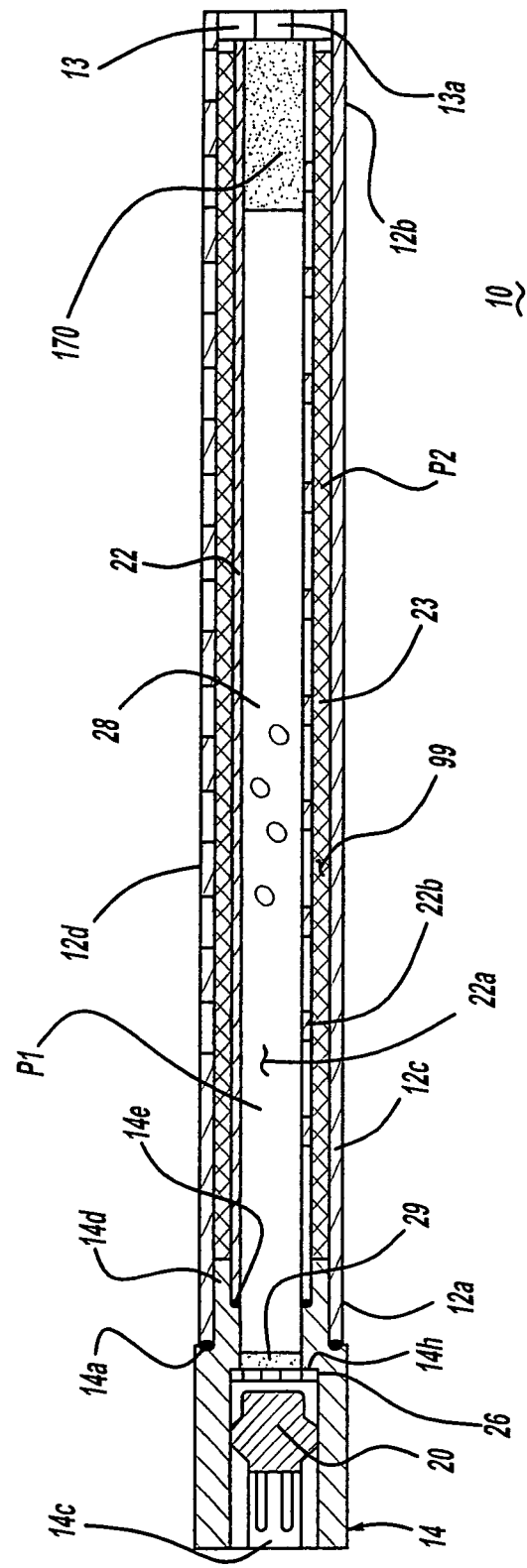
FIG. 1 is a cross-sectional side view of a first embodiment of a gas generating system in accordance with the present invention.

FIG. 1 shows one embodiment of a gas generating system 10 in accordance with the present invention.

Gas generating system 10 is generally constructed of components made from a durable metal such as carbon steel or iron, but may also include components made from tough and impact-resistant polymers, for example. One of ordinary skill in the art will appreciate various methods of construction for the various components of the inflator.

U.S. Pat. Nos. 5,035,757, 6,062,143, 6,347,566, U.S. Patent Application Serial Nos. 2001/0045735, WO 01/08936, and WO 01/08937 exemplify typical designs for the various inflator components, and are incorporated herein by reference in their entirety, but not by way of limitation. Referring to FIG. 1, gas generating system 10 includes a substantially cylindrical outer housing 12 having a first end 12a, a second end 12b opposite the first end, and a wall 12c extending between the ends to define a housing interior cavity. Outer housing 12 is made from a metal or metal alloy and may be deep-drawn, extruded, or otherwise metal-formed. Alternatively, outer housing 12 may be molded, extruded, or otherwise formed from a suitable polymer material. A plurality of gas exit orifices 12d are provided along a length of outer housing 12 for enabling fluid communication between an interior of the housing and an associated inflatable device (for example, an airbag or a safety belt pretensioner incorporated into a vehicle occupant protection system.) In a particular embodiment, orifices 12d are substantially collinear along a length of the outer housing.

In one embodiment, the gas generating system is a micro gas generator with outer housing 12, 112 having an outer diameter varying within a range of approximately 16 millimeters to approximately 20 millimeters, and is usable in, for example, a side seat inflator or a safety belt pretensioner. The gas generating system may also be installed in a vehicle A-pillar, C-pillar, in a vehicle door frame, or within a seat. However, the characteristics of the embodiments described herein may be incorporated into gas generating systems of many alternative sizes, usable for a variety of different applications.

In accordance with a first embodiment of the present invention, and as exemplified in FIG. 1, a first end closure 14 is welded or otherwise suitably secured to outer housing first end 12a to form a gas-tight seal between the housing and the end closure. In the embodiment shown in FIG. 1, first end closure 14 has formed thereon an annular wall 14d, an outer shoulder 14a extending along an exterior of wall 14d, an inner shoulder 14e extending along an interior of wall 14d, a cavity 14c, and a shoulder 14h formed along a wall defining cavity 14c. First end closure 14 may be machined, cast, or otherwise metal-formed.

Figure 2:
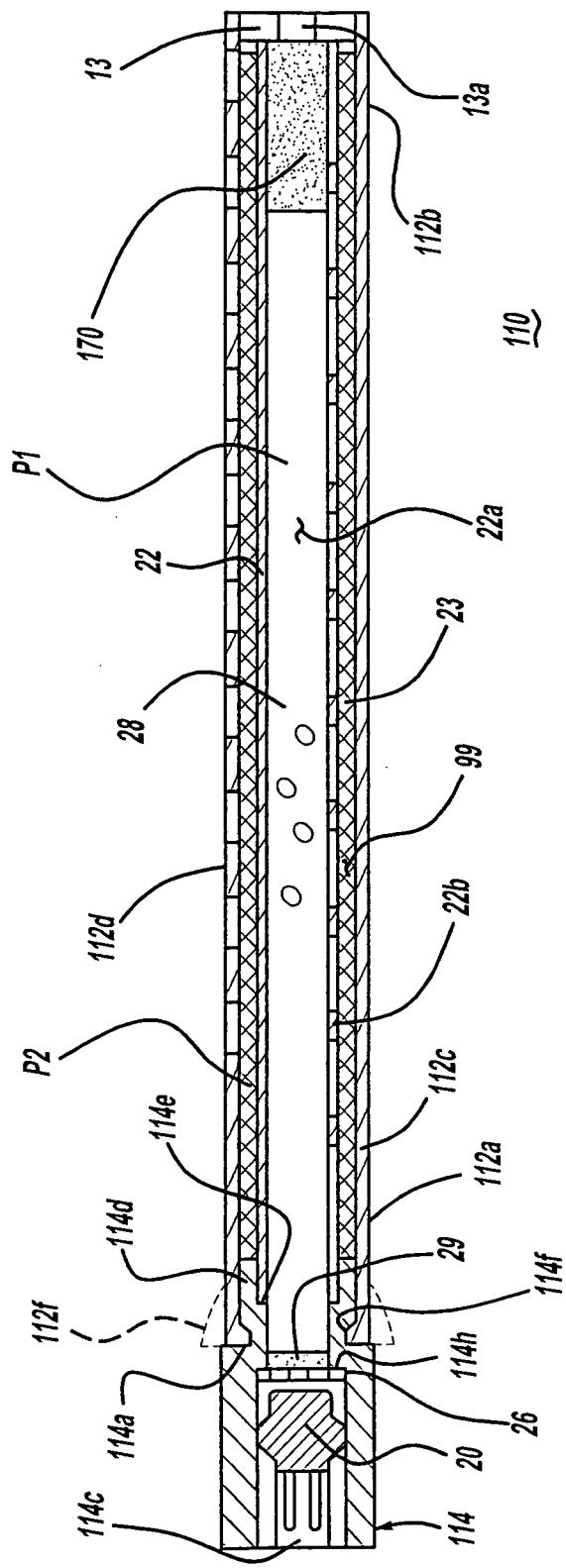
FIG. 2 is a cross-sectional side view of a second embodiment of a gas generating system in accordance with the present invention.

In another embodiment, and as exemplified in FIG. 2, outer housing first end 112a is cold-worked or otherwise metal-formed around a first end closure 114 formed from a metal or metal alloy to retain the end closure at housing first end 112a, thereby forming a gas-tight, metal-to-metal seal between the housing and the end closure.

In this embodiment, end closure 114 has formed therealong a peripheral groove or recessed portion 114f. An annular flange or protrusion 112f of housing first end 112a (shown as a dotted line in a pre-cold-worked state in FIG. 2, and also shown as compressed within the groove 114f), is drawn through a die to cold-work and thereby compress the flange within the groove 114f, thereby forcing the material of housing first end 112a to cold flow into groove 114f and forming a gas-tight, metal-to-metal seal. Other known metal-forming methods may also be employed. The diameter of the gas generating system may thus be effectively minimized by eliminating the need for a typical seal such as an o-ring at the end closure and outer housing interface within groove 114f, and also by compressing the annular flange 112d within groove 114f. It will be appreciated that the volume of the annular flange or protruding portion 112f is at least approximately or substantially equal to the volume defined by the groove 114f. Accordingly, a flush metal-to-metal contact is formed at the interface between groove 114f and flange 112f once the end portion of the substantially assembled gas generating system is drawn and compressed through a die having a smaller diameter than the outer diameter of the annular flange 112f prior to cold-working. By cold-working the end of outer tube or housing 112 to fit within groove 114f, the housing 112 is compressed to provide sufficient strength in accordance with customer specifications while simplifying the manufacturing process by reducing surface treatment and/or obviating the need for incorporation of additional parts, such as an o-ring. As shown in the embodiment of FIG. 2, the portion of outer housing first end 112a is pressed into peripheral cavity 114f to secure the end closure to outer housing 112 and at the same time provide hermetic sealing of the inflator. The cold-work technique of fitting and sealing the end closure 114 within the housing end 112a results in the ability to substantially reduce the diameter of the inflator to less than one inch outer diameter, while retaining the structural and other design requirements surrounding the shorting clip or ignition assembly, as determined by the customer.

In another aspect of the present invention, outer housing 12, 112 has an outer diameter of approximately 16 millimeters along substantially its entire length. End closure 14, 114 is coupled to an end of the housing to form a gas-tight seal between the housing and the end closure, wherein the outer diameter of the housing proximate the seal is approximately 20 millimeters. Outer housing 12, 112 also has a maximum outer diameter of approximately 20 millimeters. Thus, using the cold-forming method described herein to effect a gas-tight seal enables a reduction in the gas generator packaging size relative to previous designs and also increases the design flexibility with regard to particular applications of the gas generator, for example as a side inflator within a seat assembly.

Referring again to FIG. 1, a second end closure 13 is welded or otherwise suitably secured to outer housing second end 12b. Second end closure 13 contains one or more gas exit orifices 13a for enabling fluid communication between an interior of the inner housing 22 (described below) and an associated inflatable device (for example, an airbag or a safety belt pretensioner incorporated into a vehicle occupant protection system.) Second end closure 13 is made from a metal or metal alloy and may be cast, stamped, or otherwise metal-formed.

Referring again to FIG. 1, inner shoulder 14e on first end closure 14 is adapted to abut a first end portion of an inner housing 22. An end of inner housing 22 is welded or otherwise suitably secured to inner shoulder 14e. In the embodiment of the gas generating system shown in FIG. 1, inner housing 22, in combination with a portion of first end closure 14, a center plate 26 (described below) and a cushion 30 (described below) define a main combustion chamber 22a containing a main gas generant composition 28 (described in greater detail below.) Inner housing 22 is spaced apart from outer housing wall 12c to form an annular gas flow passage 23 extending between inner housing 22 and outer housing 12. Inner housing 22 includes at least one and preferably a plurality of gas exit apertures 22b formed therealong to enable fluid communication between combustion chamber 22a and gas flow passage 23. In a particular embodiment, orifices 22b are substantially collinear along a length of the outer housing and are positioned angularly spaced apart approximately 180° from outer housing gas exit orifices 12d. Inner housing 22 is made from a metal or metal alloy and may be deep-drawn, extruded, or otherwise metal-formed.

Referring again to FIG. 1, an igniter assembly 20 is positioned and secured within first end closure cavity 14c so as to enable operative communication between inner housing 22 containing gas generant 28 and an igniter incorporated into the igniter assembly, for igniting gas generant 28 upon activation of the gas generating system. Igniter assembly 20 may be secured in cavity 14c using any one of several known methods, for example, by welding, crimping, using an interference fit, or by adhesive application. An igniter assembly suitable for the application described herein may be obtained from any of a variety of known sources, for example Takata Cpi Singapore Pte, Ltd. or Specialty Devices, Inc.

Referring to FIG. 1, a perforate center plate 26 is press-fit or otherwise suitably secured within first end closure 14. In the embodiment shown in FIG. 1, at least one orifice 26a is provided in center plate 26 to enable fluid communication between igniter assembly 20 and gas generant combustion chamber 22a formed in inner housing 22. Center plate 26 is made from a metal or metal alloy and may be a cast, stamped, or otherwise metal-formed. A rupturable, fluid-tight seal (not shown) may be positioned across orifice(s) 26a to fluidly isolate cavity 14c from combustion chamber 22a prior to activation of the gas generating system. The seal is secured to a face of center plate 26 and forms a fluid-tight barrier between cavity 14c and combustion chamber 22a. Various known disks, foils, films, tapes, or other suitable materials may be used to form the seal.

Referring again to FIG. 1, a main gas generant composition 28 is positioned within combustion chamber 22a. Any suitable gas generant composition may be used, in any suitable form. In a one embodiment, gas generant 28 includes a mixture of a high-nitrogen fuel selected from the class consisting of 1-, 3-, and 5-substituted nonmetal salts of triazoles, and, 1- and 5-substituted nonmetal salts of tetrazoles; a first oxidizer selected from the group consisting of phase stabilized ammonium nitrate; a metallic second oxidizer; and an inert component.

In another embodiment, gas generant 28 includes a mixture of a high-nitrogen fuel selected from the class consisting of 1-, 3-, 5-substituted amine salts of triazoles and 1- and 5-substituted amine salts of tetrazoles, the fuel being employed in a concentration of 13 to 38% by weight of the gas generant composition; a first oxidizer consisting of phase stabilized ammonium nitrate, the first oxidizer being employed in a concentration of 46 to 87% by weight of the gas generant composition; a metallic second oxidizer employed in a concentration of 0.1 to 25% by weight of the gas generant composition; and an inert component employed in a concentration of 0.1 to 8% by weight of the gas generant composition, wherein the fuel is selected from the group consisting of monoguanidinium salt of 5,5'-Bi-1H-tetrazole, diguanidinium salt of 5,5'-Bi-1H-tetrazole, monoaminoguanidinium salt of 5,5'-Bi-1H-tetrazole, diaminoguanidinium salt of 5,5'-Bi-1H-tetrazole monohydrazinium salt of 5,5'-Bi-1H-tetrazole, dihydrazinium salt of 5,5'-Bi-1H-tetrazole, monoammonium salt of 5,5'-Bi-1H-tetrazole, diammonium salt of 5,5'-Bi-1H-tetrazole, mono-3-amino-1,2,4-triazolium salt of 5,5'-Bi-1H-tetrazole, di-3-amino-1,2,4-triazolium salt of 5,5'-Bi-1H-tetrazole, diguanidinium salt of 5,5'-Azobis-1H-tetrazole, and monoammonium salt of 5-Nitramino-1H-tetrazole.

In yet another embodiment, gas generant 28 includes a mixture of a high-nitrogen nonazide fuel selected from the class consisting of 1-, 3-, and 5-substituted amine salts of triazoles, and, 1- and 5-substituted amine salts of tetrazoles; and dry-mixed with an oxidizer selected from the group consisting of phase stabilized ammonium nitrate.

In another embodiment, gas generant 28 includes a mixture of a high-nitrogen nonazide fuel selected from the class consisting of 1-, 3-, 5-substituted amine salts of triazoles and 1- and 5-substituted amine salts of tetrazoles, the fuel being employed in a concentration of 15 to 65% by weight of the gas generant composition; and an oxidizer consisting of phase stabilized ammonium nitrate, the oxidizer being employed in a concentration of 35 to 85% by weight of the gas generant composition, wherein the fuel is selected from the group consisting of monoguanidinium salt of 5,5'-Bis-1H-tetrazole, diguanidinium salt of 5,5'-Bis-1H-tetrazole, monoaminoguanidinium salt of 5,5'-Bis-1H-tetrazole, diaminoguanidinium salt of 5,5'-Bis-1H-tetrazole, monohydrazinium salt of 5,5'-Bis-1H-tetrazole, dihydrazinium salt of 5,5'-Bis-1H-tetrazole, monoammonium salt of 5,5'-bis-1H-tetrazole, diammonium salt of 5,5'-bis-1H-tetrazole, mono-3-amino-1,2,4-triazolium salt of 5,5'-bis-1H-tetrazole, di-3-amino-1,2,4-triazolium salt of 5,5'-bis-1H-tetrazole, diguanidinium salt of 5,5'-Azobis-1H-tetrazole, and monoammonium salt of 5-Nitramino-1H-tetrazole.

A quantity of a known auto-ignition compound 29 may be positioned within the gas generating system so as to enable fluid communication between gas generant 28 and the auto-ignition compound upon activation of the gas generating system. In a manner known in the art, ignition of gas generant 28 is produced by combustion of auto-ignition material 29 resulting from activation of igniter assembly 20 or excessive external heating of outer housing 12, in a manner well-known in the art. Suitable auto ignition materials are known to those skilled in the art.

Examples of suitable auto-ignition materials are nitro-cellulose based compositions and gun powder. Alternatively, combustion of gas generant 28 may be initiated by combustion of a known booster propellant (not shown) without the use of an auto-ignition material.

If desired, a quantity of a known or suitable ignition or booster compound (not shown) may be positioned intermediate igniter assembly 20 and main gas generant 22. Combustion of the booster compound (produced by activation of igniter assembly 20) ignites main gas generant charge 28 positioned in combustion chamber 22a.

Referring again to FIG. 1, a porous pad cushion 170 formed from, for example, a ceramic fiber material or knitted wire is provided for holding the gas generant 28 in place and for cushioning the gas generant against vibration and impact.

In addition, a quantity of a filter material 99 may be provided between inner housing gas exit apertures 22b and outer housing gas exit orifices 12d to filter combustion products from the inflation fluid prior to gas distribution. Any suitable metallic mesh filter or woven wire cloth may be used, many examples of which are known and obtainable from commercially available sources (for example, Wayne Wire Cloth Products, Inc. of Bloomfield Hills, Mich.)

If desired, rupturable, fluid-tight seals (not shown) may also be provided over outer housing gas exit orifices 12d, inner housing gas exit apertures 22b, and/or second end closure orifice 13a to further isolate the interior of the gas generating system from the external environment.

In operation of the embodiment shown in FIGS. 1 and 2, upon receipt of a signal from a crash sensor, an electrical activation signal is sent to igniter 20a. Combustion products from the igniter expand through the orifice in center plate 26, igniting auto-ignition material 29. Products from the combustion of auto-ignition material 29 expand into combustion chamber 22a, igniting main gas generant 28. Gases and other combustion products generated by combustion of gas generant 28 are forced radially outward at a relatively high velocity toward gas exit apertures 22b by the internal pressure in inner housing 22. Gases then flow through multiple orifices 22b in inner housing 22 into gas flow passage 23, charging the gas flow passage with a pressure which is slightly lower than the pressure within the inner housing 22. As the main gas generant burns, both P1 (internal housing pressure) and P2 (gas flow passage pressure) increase at the same rate and gases flow through the gas flow passage 23. Products from combustion of gas generant 28 proceed through inner housing gas exit apertures 22b into annular gas flow passage 23 and along passage 23 toward the downstream end of inner housing 22, and around inner housing 22 toward gas exit orifices 12d along outer housing 12. The pressure waves caused by combustion of the gas generant propagate along the interior of inner housing 22, toward second end closure 13. Second end closure 13 effectively acts as an orifice plate which attenuates the propagating pressure waves.

Figure 3:
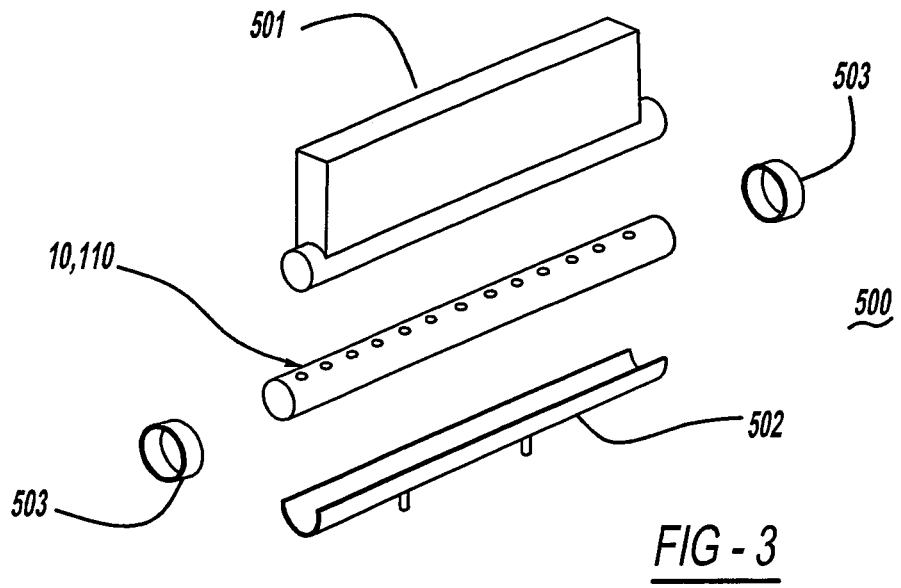
FIG. 3 is a schematic view of an exemplary gas generating system as employed in an airbag module, in accordance with the present invention.

An embodiment of the gas generating system 10, 110 described above may be incorporated into any of a variety of vehicle occupant protection systems or system elements. In one example, shown in FIG. 3, a version of the gas generating system is incorporated into an airbag module 500. Module 500 includes a vacuum pre-folded airbag 501, a mounting frame 502, a gas generating system 10, 110, and mounting clips 503 for securing together the elements of module 500. Gas generating system 10 is oriented such that outer housing gas exit orifices 12d, 112d (see FIGS. 1 and 2) are in fluid communication with an interior of airbag 501. Upon activation of the airbag module, inflation gases from gas generating system 10, 110 exit gas exit orifices 12d, 112d and expand into the interior of the airbag to fill the airbag.

Figure 4:
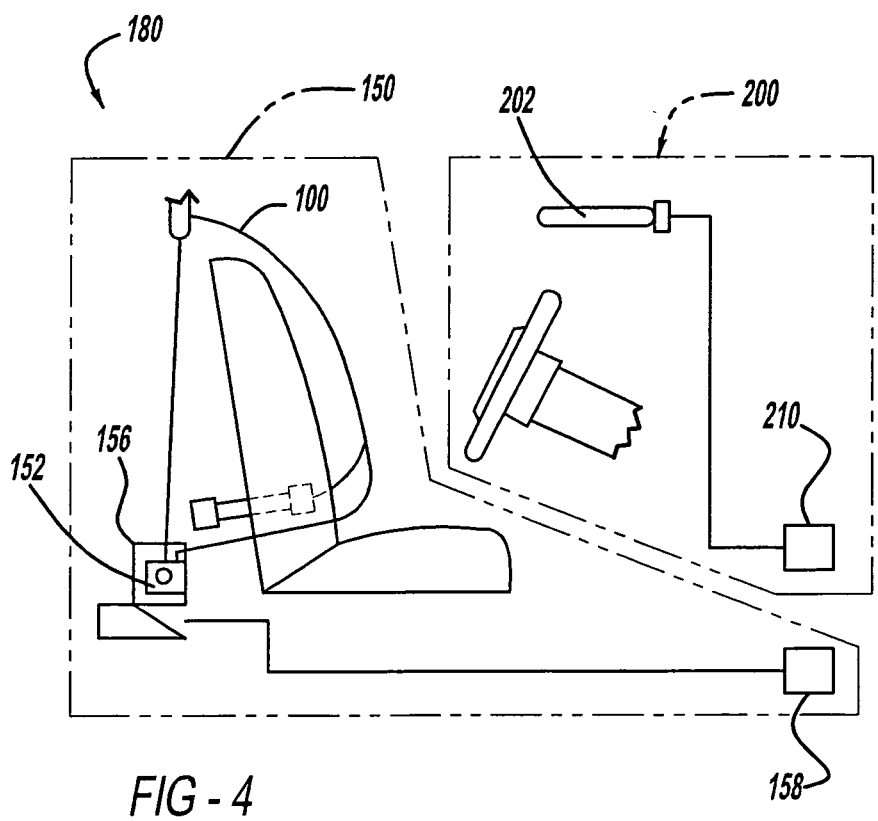
FIG. 4 is a schematic view of an example of a vehicle occupant protection system incorporating a gas generating system in accordance with an embodiment the present invention.

Referring now to FIG. 4, an embodiment of the gas generating system 10 described above may also be incorporated into a safety belt assembly 150 for pretensioning the safety belt. FIG. 4 shows a schematic diagram of one exemplary embodiment of an exemplary safety belt assembly 150. Safety belt assembly 150 includes a safety belt housing 152 and a safety belt 100 extending from housing 152. A safety belt retractor mechanism (for example, a spring-loaded mechanism) may be coupled to an end portion of the belt. In addition, a safety belt pretensioner 156 may be coupled to the belt retractor mechanism to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, incorporated herein by reference. Illustrative examples of typical gas-actuated pretensioners with which the safety belt embodiments of the present invention may be combined are described in U.S. Pat. Nos. 6,505,790 and 6,419,177, incorporated herein by reference.

Safety belt assembly 150 may also include (or be in operative communication with) a crash event sensor 158 (for example, an inertia sensor or an accelerometer) operates in conjunction with a crash sensor algorithm that signals actuation of belt pretensioner 156 via, for example, activation of an igniter (not shown in FIG. 4) incorporated into the gas generating system. U.S. Pat. Nos. 6,505,790 and 6,419,177, previously incorporated herein by reference, provide illustrative examples of pretensioners actuated in such a manner.

Referring again to FIG. 4, safety belt assembly 150 may also be incorporated into a broader, more comprehensive vehicle occupant restraint system 180 including additional elements such as an airbag system 200. Airbag system 200 includes at least one airbag 202 and a gas generating system 204 coupled to airbag 202 so as to enable fluid communication with an interior of the airbag. Airbag system 200 may also include (or be in operative communication with) a crash event sensor 210. Crash event sensor 210 operates in conjunction with a known crash sensor algorithm that signals actuation of airbag system 200 via, for example, activation of airbag gas generating system 10 in the event of a collision.

It should be appreciated that safety belt assembly 150, airbag system 200, and more broadly, vehicle occupant protection system 180 exemplify but do not limit uses of gas generating systems contemplated in accordance with the present invention. In addition, it should be appreciated that a gas generating system incorporating a plurality of particulate aggregation surfaces and a high gas-yield, low solids-producing gas generant composition as described herein may be used in the airbag system or in other vehicle occupant protection system elements requiring a gas generating system for operation.

In yet another aspect of the invention, a method of manufacturing an inflator may be described as follows:
1. Providing an outer housing having a first end and a second end, and a periphery.
2. Forming an outer protrusion, or annular flange, about the periphery at the first end.
3. Providing an end closure having a recessed portion, or a groove.
4. Inserting the end closure within the outer housing at the first end, thereby laterally aligning the outer protrusion and the recessed portion; and
5. Compressing the outer protrusion within the recessed portion. Compressing includes cold-working or otherwise metal-forming the coupling of the protrusion and recessed portion.

A gas generating system and a vehicle occupant protection system containing a gas generating system formed by the method described above are also included. The text describing the end closure 114 coupled to the first end 112a of housing 112, given above, is incorporated herein by reference, to fully inform the reader of the details of this method.

It will be understood that the foregoing description of the present invention is for illustrative purposes only, and that the various structural and operational features herein disclosed are susceptible to a number of modifications, none of which departs from the spirit and scope of the present invention. The preceding description, therefore, is not meant to limit the scope of the invention. Rather, the scope of the invention is to be determined only by the appended claims and their equivalents.

What is claimed is:

1. A gas generating system comprising an inner housing, an outer housing, and an end closure attached to the inner housing, the end closure having an annular wall and a first shoulder extending along an interior of the wall, wherein the inner housing is attached to the wall along the first shoulder,
wherein, a gas-tight seal is formed between the outer housing and the end closure by compressing an end portion of the outer housing onto the end closure so as to cold flow a portion of the outer housing material into a recess formed in the end closure.

2. The gas generating system of claim 1 wherein the end closure is welded to an end of the inner housing to form a gas-tight seal between the inner housing and the end closure.

3. The gas generating system of claim 1 further comprising a gas generant composition including a mixture of:
a high-nitrogen fuel selected from the class consisting of 1-, 3-, and 5-substituted nonmetal salts of triazoles, and, 1- and 5-substituted nonmetal salts of tetrazoles;
a first oxidizer selected from the group consisting of phase stabilized ammonium nitrate;
a metallic second oxidizer; and
an inert component.

4. The gas generating system of claim 1 further comprising a gas generant composition including a mixture of:
a high-nitrogen fuel selected from the class consisting of 1-, 3-, 5-substituted amine salts of triazoles and 1- and 5-substituted amine salts of tetrazoles, said fuel employed in a concentration of 13 to 38% by weight of the gas generant composition;
a first oxidizer consisting of phase stabilized ammonium nitrate, said first oxidizer employed in a concentration of 46 to 87% by weight of the gas generant composition;
a metallic second oxidizer employed in a concentration of 0.1 to 25% by weight of the gas generant composition; and
an inert component employed in a concentration of 0.1 to 8% by weight of the gas generant composition, wherein said fuel is selected from the group consisting of monoguanidinium salt of 5,5'-Bi-1H-tetrazole, diguanidinium salt of 5,5'-Bi-1H-tetrazole, monoaminoguanidinium salt of 5,5'-Bi-1H-tetrazole, diaminoguanidinium, salt of 5,5'-Bi-1H-tetrazole monohydrazinium salt of 5,5'-Bi-1H-tetrazole, dihydrazinium salt of 5,5'-Bi-1H-tetrazole, monoammonium salt of 5,5'-Bi-1H-tetrazole, diammonium salt of 5,5'-Bi-1H-tetrazole, mono-3-amino-1,2,4-triazolium salt of 5,5'-Bi-1H-tetrazole, di-3-amino-1,2,4-triazolium salt of 5,5'-Bi-1H-tetrazole, diguanidinium salt of 5,5'-Azobis-1H-tetrazole, and monoammonium salt of 5-Nitrarnino-1H-tetrazole.

5. The gas generating system of claim 1 further comprising a gas generant composition including a mixture of a high-nitrogen nonazide fuel selected from the class consisting of 1-, 3-, and 5-substituted amine salts of triazoles, and, 1- and 5-substituted amine salts of tetrazoles; and dry-mixed with an oxidizer selected from the group consisting of phase stabilized ammonium nitrate.

6. The gas generating system of claim 1 further comprising a gas generant composition including a mixture of:
a high-nitrogen nonazide fuel selected from the class consisting of 1-, 3-, 5-substituted amine salts of triazoles and 1- and 5-substituted amine salts of tetrazoles, said fuel employed in a concentration of 15 to 65% by weight of the gas generant composition; and
an oxidizer consisting of phase stabilized ammonium nitrate, said oxidizer employed in a concentration of 35 to 85% by weight of the gas generant composition,
wherein said fuel is selected from the group consisting of monoguanidinium salt of 5,5'-Bis-1H-tetrazole, diguanidinium salt of 5,5'-Bis-1H-tetrazole, monoaminoguanidinium salt of 5,5'-Bis-1H-tetrazole, diaminoguanidinium salt of 5,5'-Bis-1H-tetrazole, monohydrazinium salt of 5,5'-Bis-1H-tetrazole, dihydrazinium salt of 5,5'-Bis-1H-tetrazole, monoammonium salt of 5,5'-Bis-1H-tetrazole, diammonium salt of 5,5'-bis-1H-tetrazole, mono-3-amino-1,2,4-triazolium salt of 5,5'-bis-1H-tetrazole, di-3-amino-1,2,4-triazolium salt of 5,5'-bis-1H-tetrazole, diguanidinium salt of 5,5'Azobis-1H-tetrazole, and monoammonium salt of 5-Nitramino-1H-tetrazole.

7. A vehicle occupant protection system comprising a gas generating system in accordance with claim 1.

8. An airbag module comprising a gas generating system in accordance with claim 1.

9. The gas generating system of claim 1 wherein the outer housing has a maximum outer diameter of approximately 20 millimeters.

10. A vehicle occupant protection system comprising a gas generating system in accordance with claim 1.

11. An airbag module comprising a gas generating system in accordance with claim 1.

12. The gas generating system of claim 1 wherein the outer housing has an outer diameter of approximately 16 millimeters along substantially its entire length.

13. The gas generating system of claim 1 further comprising a second shoulder extending along an exterior of the wall, said outer housing attached to the wall along the first shoulder, and wherein a portion of the wall is interposed between the inner and outer housings to define a spacing between the inner and outer walls.

14. A gas generating system comprising an inner housing and an end closure attached to the housing, the end closure having an annular wall and a first shoulder extending along an interior of the wall, wherein the inner housing is attached to the wall along the first shoulder, wherein the wall defines an opening in a first end of the end closure, the first end opening being configured to receive the inner housing when the inner housing is inserted therein in a first direction, and wherein the end closure further comprises a second shoulder extending along the interior of the wall and spaced apart from the first shoulder, the second shoulder and a portion of the wall adjacent the second shoulder defining a cavity configured for receiving an igniter therein when the igniter is inserted into the cavity in a second direction opposite the first direction.

15. A gas generating system comprising:
an outer housing formed at least in part from a metallic material; and
an end closure formed at least in part from a metallic material defining a recessed portion having a shape, the outer housing including a portion of the metallic outer housing material cold-flowed into the recessed portion of the end closure so as to conform to at least a portion of the shape of the recessed portion, such that a gas-tight metal-to-metal seal is formed between the cold-flowed portion of the housing and the end closure.

* * * * *